No. 749,557. PATENTED JAN. 12, 1904.
H. HIGGIN.
TOP PROP.
APPLICATION FILED NOV. 10, 1903.
NO MODEL.

Witnesses
Earle R. Passel
Theo. W. Meader

Inventor
Henry Higgin
By Attorneys
Parkinson + Richards

No. 749,557.

Patented January 12, 1904.

UNITED STATES PATENT OFFICE.

HENRY HIGGIN, OF NEWPORT, KENTUCKY, ASSIGNOR TO THE HIGGIN MANUFACTURING COMPANY, OF NEWPORT, KENTUCKY.

TOP-PROP.

SPECIFICATION forming part of Letters Patent No. 749,557, dated January 12, 1904.

Application filed November 10, 1903. Serial No. 180,528. (No model.)

*To all whom it may concern:*

Be it known that I, HENRY HIGGIN, a citizen of the United States, residing at Newport, in the county of Campbell and State of Kentucky, have invented certain new and useful Improvements in Top-Props, of which the following is a specification.

The object of my invention is to provide a top-prop for buggies or other vehicles of improved construction; and my invention consists in the combination and arrangement of parts hereinafter described and claimed.

Figure 1:
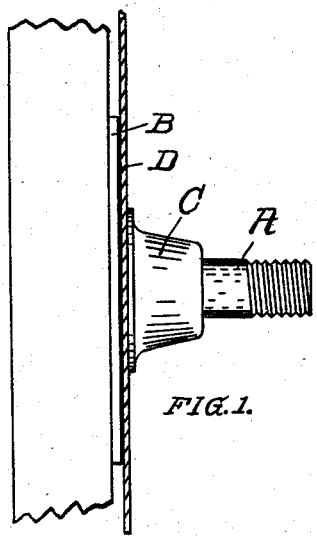
Figure 2:
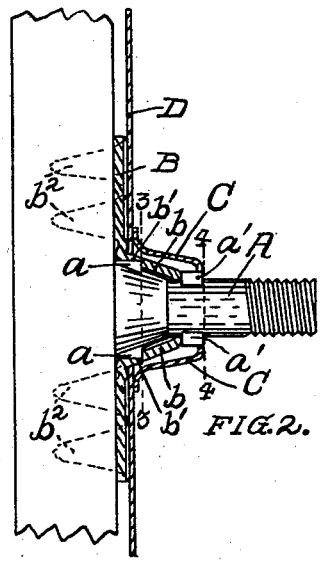
Figure 3:
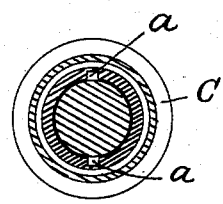
Figure 4:
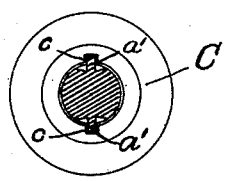

In the drawings, Figure 1 is a side elevation of a top-prop embodying my invention; Fig. 2, a longitudinal section of the same; Figs. 3 and 4, sections on lines 3 3 and 4 4 of Fig. 2.

For the stem of the top-prop an ordinary plow-bolt A, having two lugs $a$ on its head, is used. The base-plate B is preferably of open-hearth steel stamped into form with a socket $b$ to fit the head of the plow-bolt A and having recesses or notches $b'$ to receive the lugs $a$ on the head of the plow-bolt A. The usual screw-holes are also provided to take screws $b^2$ for holding the top-prop in position. In construction the plow-bolt A is pressed into socket $b$ with lugs $a$ taking into notches $b'$, which hold the plow-bolt against turning. Then lugs or stops $a'$ are drawn up from the shank of plow-bolt A in front of socket $b$ to prevent removal of the plow-bolt. A bell C, having notches $c$ to engage lugs $a'$, is provided, being preferably stamped from steel. The bell C takes over the bolt and socket against the side quarter D to give a finished appearance to the top-prop and protect the parts. By this construction I obtain top-props of uniform size and weight, thus obviating any necessity for truing up, and the parts of the prop are permanently locked together, thus obviating the use of screw-threads or other insecure fastenings.

This top-prop besides being very strong and durable has a very compact form, enabling the use of shorter bolts and bells than those in common use.

I claim as my invention—

1. A top-prop consisting of a stem having an enlarged head provided with one or more lugs; a ductile-metal base-plate formed with a socket open from the rear to receive the head of the stem, open at the front to permit the passage of the stem, and having notches to receive the lugs on the head of the stem; and permanent lugs on the shank of the stem in front of the socket adapted to prevent removal of the stem, substantially as specified.

2. A top-prop consisting of a stem having an enlarged head provided with one or more lugs; a ductile-metal base-plate formed with a socket open from the rear to receive the head of the stem, open at the front to permit the passage of the stem and having notches to receive the lugs on the head of the stem; permanent lugs on the shank of the stem in front of the socket adapted to prevent removal of the stem; and a bell adapted to take over the socket and stem and provided with notches to engage the lugs on the shank of the stem, substantially as specified.

HENRY HIGGIN.

Witnesses:
AGNES B. GRANT,
BRAYTON G. RICHARDS.